United States Patent [19]

Sugimoto

[11] Patent Number: 5,081,621
[45] Date of Patent: Jan. 14, 1992

[54] METHOD AND APPARATUS FOR CONTROLLING DATA COMMUNICATION ON A MULTI-NETWORK

[75] Inventor: Norihiko Sugimoto, Katsuta, Japan

[73] Assignee: Hitachi, Ltd., Tokyo, Japan

[21] Appl. No.: 701,377

[22] Filed: May 13, 1991

Related U.S. Application Data

[63] Continuation of Ser. No. 328,064, Mar. 23, 1989, abandoned.

[30] Foreign Application Priority Data

Apr. 5, 1988 [JP] Japan .................................. 63-82158

[51] Int. Cl.<sup>5</sup> .............................................. H04J 3/14
[52] U.S. Cl. ................................ 370/85.13; 370/85.12
[58] Field of Search ................ 370/85.12, 85.13, 85.14

[56] References Cited

U.S. PATENT DOCUMENTS

| | | | |
|---|---|---|---|
| 4,597,078 | 6/1986 | Kemph | 370/85.13 |
| 4,706,080 | 11/1987 | Sincoskie | 370/88 |
| 4,707,827 | 11/1987 | Bione et al. | 370/85.13 |
| 4,769,814 | 9/1988 | Bederman et al. | 370/88 |
| 4,811,009 | 3/1989 | Orimo et al. | 370/88 |

OTHER PUBLICATIONS

Sy Bederman, "Source Routing", Data Communication, Feb. 1986, pp. 127–128.
Floyd Backes, "Spanning Tree Bridges, Transparent Bridges for Interconnection of IEEE 802 LANs", IEEE Network, vol. 2, No. 1, Jan. 1988, pp. 5–9.
John Hart, "Extending the IEEE 802.1 MAC Bridge Standard to Remote Bridges", IEEE Network, vol. 2, No. 1, Jan. 1988, pp. 10–15.
Roy C. Dixon and Daniel A. Pitt, "Source Routing Bridges, Addressing, Bridging and Source Routing", IEEE Network, vol. 2, No. 1, Jan. 1988, pp. 25–32.

Primary Examiner—Douglas W. Olms
Assistant Examiner—Min Jung
Attorney, Agent, or Firm—Kenyon & Kenyon

[57] ABSTRACT

An identification code for identifying a data frame is added to the data frame transmitted from a station. When a bridge which interconnects transmission paths is to relay the data frame, it compares the identification code with the identification code stored in a memory under a condition of activation of a timer and relays only the data frame having a different identification code. The timer is activated by a first-coming data frame and deactivated after a predetermined time interval.

6 Claims, 4 Drawing Sheets

| FH | DA | SA | RI | I | FT |

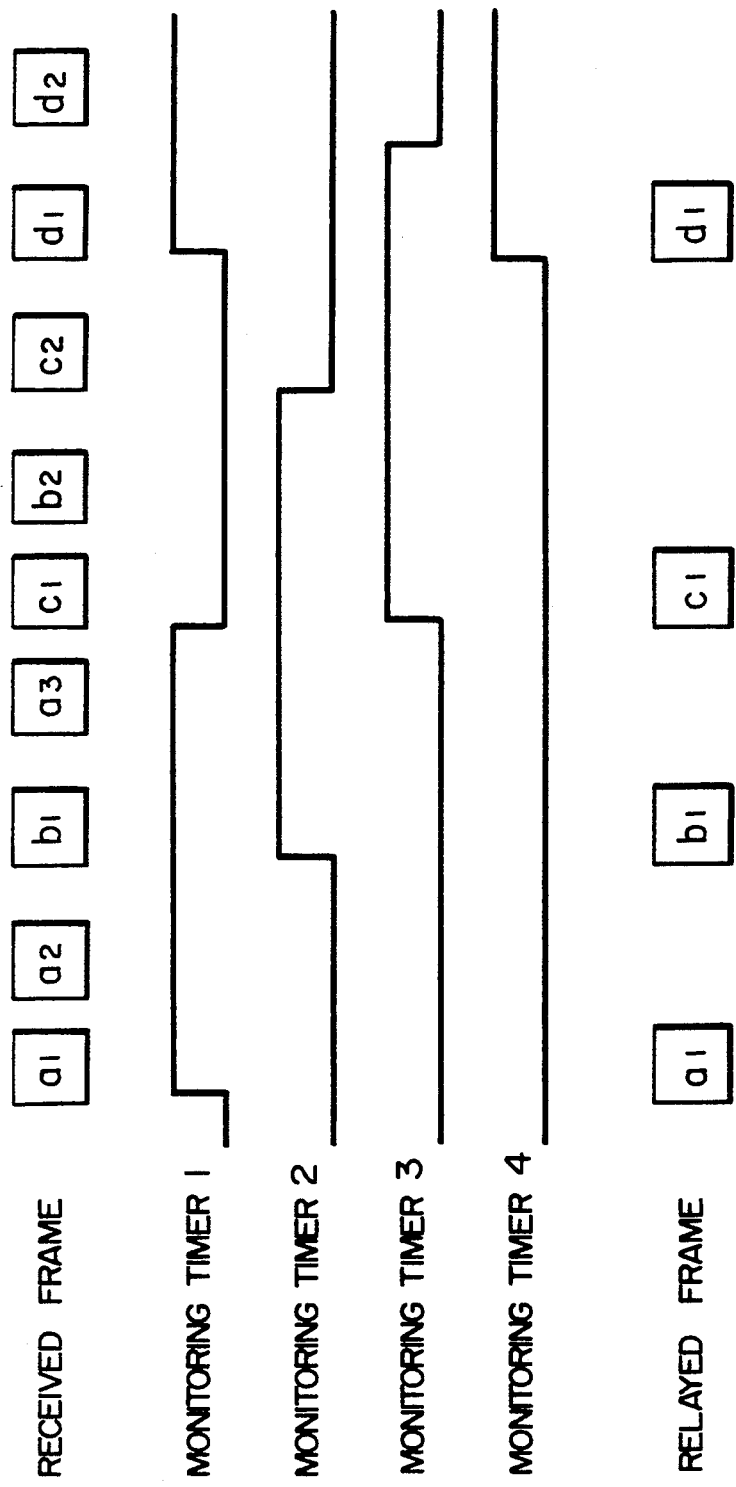

METHOD AND APPARATUS FOR CONTROLLING DATA COMMUNICATION ON A MULTI-NETWORK

This application is a continuation of application Ser. No. 07/328,064, filed Mar. 23, 1989 now abandoned.

BACKGROUND OF THE INVENTION

The present invention relates to a multi-network comprising a plurality of networks, and more particularly to a multi-network system suitable for communication without path designation such as group address communication.

Local area network, source routing, data frame format and intertransmission line bridge are described in the following references.

Sy Bederman, "Source Routing", Data Communication February 1986, pp. 127–128.

Floyd Backes, "SPANNING TREE BRIDGES, Transparent Bridges for Interconnection of IEEE 802 Lans" IEEE Network, Vol. 2, No. 1, January 1988, pp. 5–9.

John Hart, "Extending the IEEE 802.1 MAC Bridge Standard to Remote Bridges" IEEE Network, Vol. 2, No. 1, January 1988, pp. 10–15.

Roy C. Dixon and Daniel A. Pitt "SOURCE ROUTING BRIDGES, Addressing, Bridging and Source Routing", IEEE Network, Vol. 2, No. 1, January 1988, pp. 25–32.

Recently, office automation (OA) and factory automation (FA) have been promoted in offices and factories, and local area networks (LAN's) have been adapted in order to transfer information among terminal equipments. As the number of terminals connected to the network increases and the amount of information transferred increases, a so-called multi-network system in which the LAN is constructed by not a single transmission path but a plurality of transmission paths is required in order to distribute traffic and risk. In such a multi-network system, interconnection of existing LAN's, connection of a new LAN and movement of installation locations of terminal equipments can be done in a flexible manner.

FIG. 1 shows a configuration of a multi-network system conceived by the inventor of the present invention during his invention process, and FIG. 2 shows a format of a data frame transmitted in the network. In FIG. 1, R1–R7 denote transmission routes or paths, B1–B8 denote bridges, and S1–S10 denote stations.

In the multi-network system shown in FIG. 1, a number of transmission routes R1–R7 are interconnected by the bridges B1–B8, and the stations S1–S10 are connected to the transmission paths R1–R7. In FIG. 1, all of the transmission paths R1–R7 are looped although they may be bus-type transmission routes.

In the multi-network system of this configuration, one of the problems is route control to determine a route from a source station to a destination station along which information is to be transmitted. When information is to be transmitted from the station S1 connected to the transmission path R1 in the multi-network system shown in FIG. 1 to the station S2 connected to the transmission path R3, there are a plurality of transmission routes. Various route control systems for determining a specific transmission route have been known. One of them is a source routing method described in Sy Bederman, "Source Routing, Data Communication", February 1986, pp. 127–128.

In the source routing method, a data frame format by which information to be transmitted in the network is carried has a frame header FH, a destination station address DA, a source station address SA, data I, a frame trailer FT and routing information RI between the source station address SA and the data I. The routing information RI is represented by the addresses of the transmission routes R1–R7 and the addresses of the bridges B1–B8 along which the information is routed. A route inquiry frame is sent to the multi-network and the routing information is imparted to a memory by a bridge which has got a sequence of bridge addresses and transmission path addresses. Where the routing information RI is imparted in the data frame, each of the bridges B1–B8 determines whether to relay or not the data frame to the adjacent transmission path based on the routing information, and relays it in accordance with the determination result. If the content of the routing information RI has been decided, the data frame to be transmitted from a source station to a destination station in the transmission paths of the multi-network system of FIG. 1 is transmitted along the one decided route, and the destination station can receive the data frame only once.

Where a data frame without route designation is transmitted along any route in order to distribute traffic in the multi-network or prevent communication error, or where a route can not be designated because of multi-address calling in which a common data frame is simultaneously transmitted to all or a plurality of stations, the data frame transmitted from the source station is transmitted through a plurality of routes. As a result, the destination stations may receive the same data frame a plurality of times in a certain time period.

For example, in the route inquiry, there are three transmission routes 101, 102 and 103 from the source station S1 to the destination station S2. Thus, the destination station S2 receives three identical data frames. The transmitted data frame also is circulated in a route 104 comprising the transmission paths R1-R2-R5-R4-R1 and a route comprising the transmission paths R2-R3-R7-R6-R5-R2. The circulation of the data frame may also occur in the opposite directions to the above loops. As the network is more complex, the data frame is circulated in more routes.

Similarly, in the multi-address calling, all of the stations receive the identical data frame a plurality of times, and the loops are formed.

Accordingly, the destination station must select one of the plurality of received data frames. Further, since the circulation routes are formed and unnecessary data frames are circulated, the overall network has a high traffic.

SUMMARY OF INVENTION

It is an object of the present invention to provide a multi-network system in which a data frame reaches a destination station only once and the data frame does not circulate in transmission paths even if routing information RI in the data frame has not been decided.

It is another object of the present invention to provide a multi-network system in which each station need not do an additional process of selecting one of identical data frames due to multi-reception of the identical data frames and a loss of traffic due to a looped data frame is avoided.

In accordance with the present invention, the above objects are achieved by adding an identification code to each data frame so that the bridge does not relay or transfer the identical data frame to an adjacent transmission path.

When the bridge receives a data frame to be relayed, it checks, by the identification code of the data frame, whether the identical data frame has already been received, and if it has already been received, the bridge does not relay the currently received data frame to the adjacent transmission path but discards it. To this end, when the bridge receives a new data frame, it stores it in a memory and starts a monitoring timer. The monitoring timer is set to a value larger than a maximum routing time in the multi-network system. Thus, the bridge detects the identical data frame from the data frames received in the interval of the monitoring timer based on the source station address, destination station address and identification code, and if it detects the identical data frame, it discards that data frame. The bridge has several sets of memory for storing the data frame and monitoring timer so that identical data frames can be detected simultaneously for a plurality of data frames.

BRIEF DESCRIPTION OF THE DRAWINGS

FIG. 6 shows a time chart therefor.

DETAILED DESCRIPTION OF THE PRESENT INVENTION

One embodiment of the multi-network system of the present invention is explained in detail with reference to the drawings.

Figure 3:
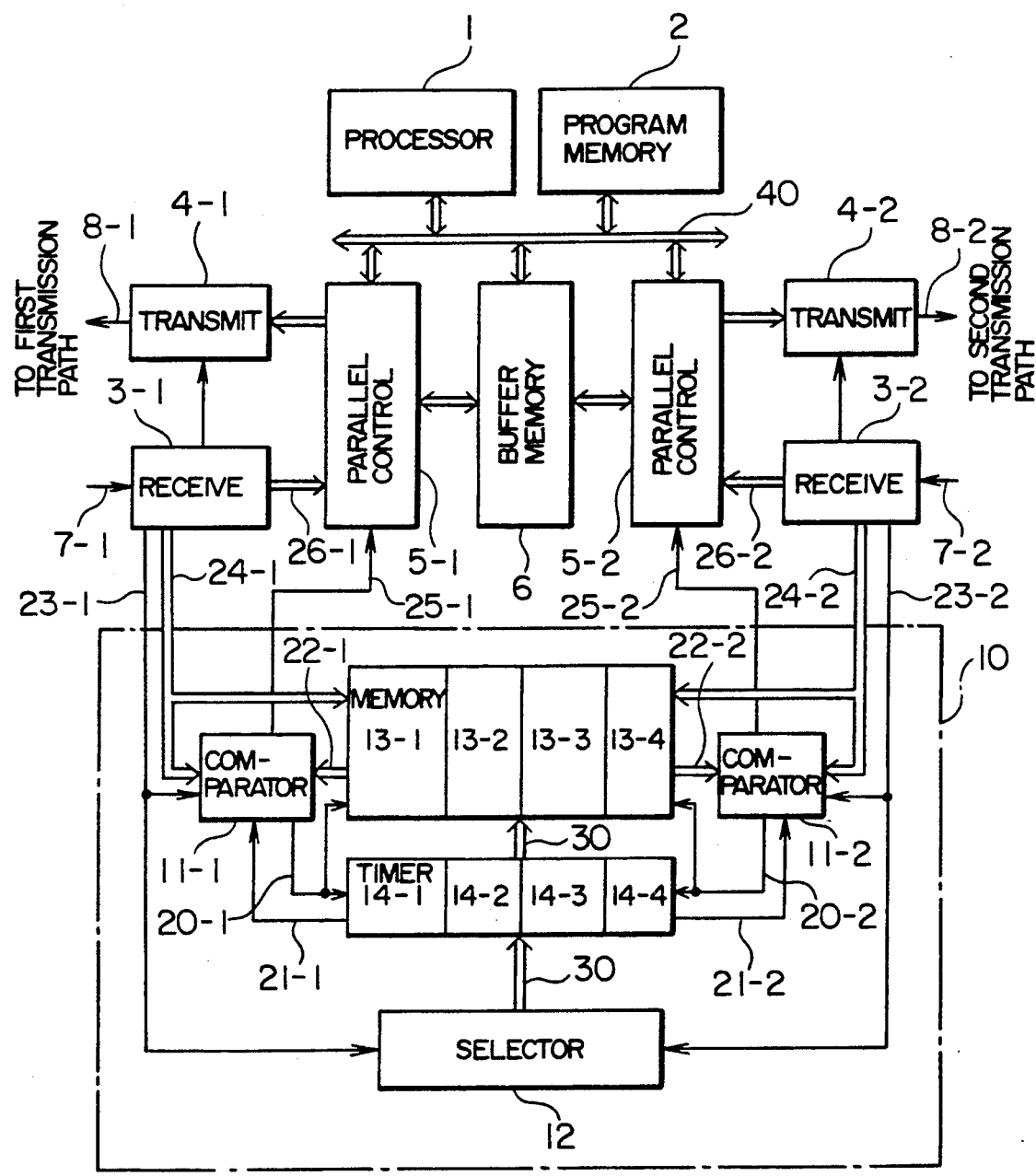
FIG. 3 shows a block diagram of a bridge in one embodiment of the present invention.
Figure 4:
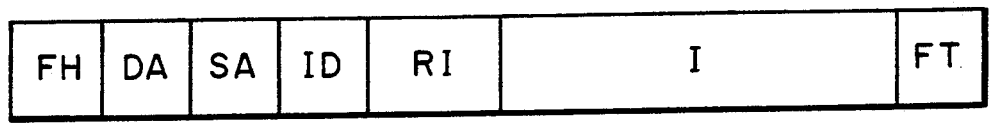
FIG. 4 shows a data frame format in one embodiment of the present invention.
Figure 5:
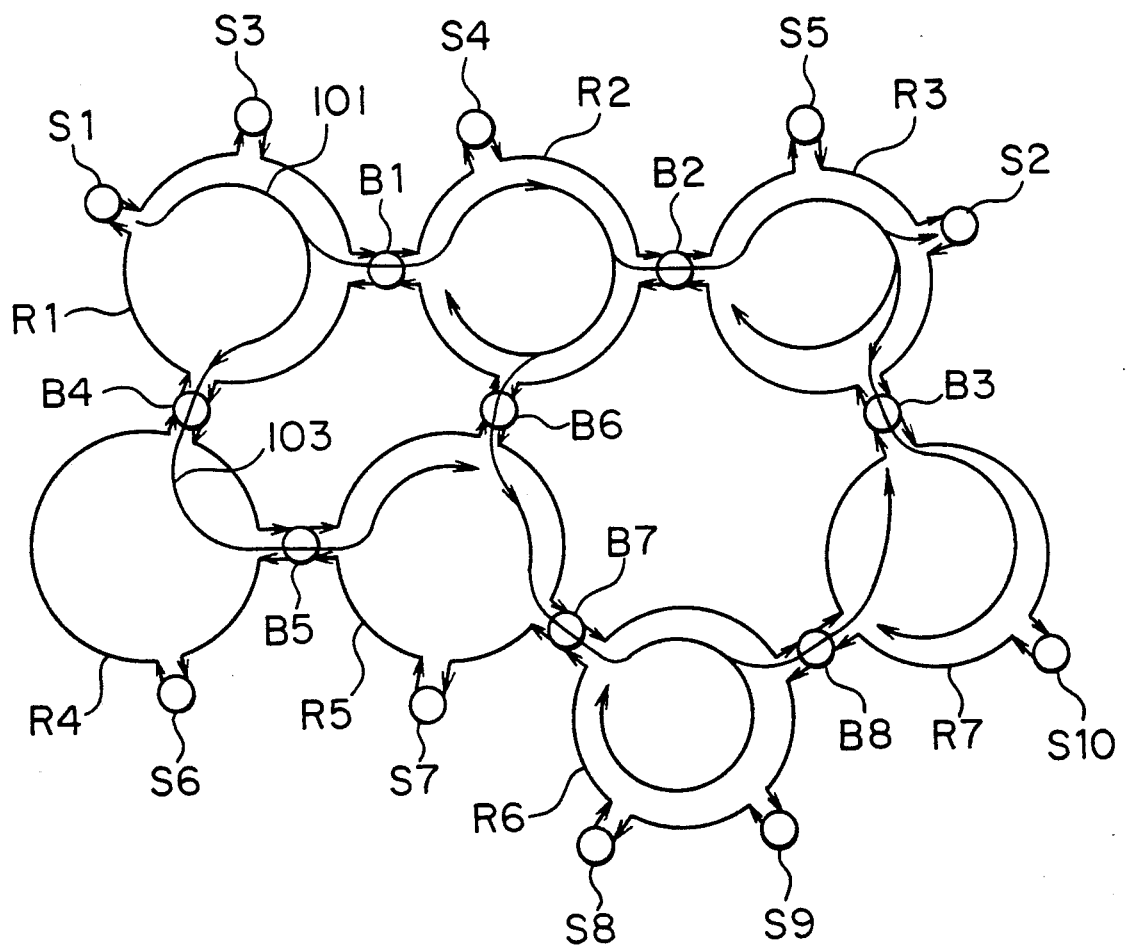
FIG. 5 shows a flow of frame in the multi-network system of the present invention.

FIG. 3 shows a block diagram of a bridge in one embodiment of the present invention, FIG. 4 shows a data frame format in the embodiment, FIG. 5 shows a flow of frame in the multi-network system of the present invention, and FIG. 6 shows a time chart therefor. In FIG. 3, numeral 1 denotes a processor, numeral 2 denotes a program memory, numerals 3-1 and 3-2 denote receive units, numerals 4-1 and 4-2 denote transmit units, numerals 5-1 and 5-2 denote parallel control circuits, numeral 6 denotes a buffer memory, numeral 10 denotes a frame check circuit, numerals 11-1 and 11-2 denote comparators, numeral 12 denotes a selector, numerals 13-1 to 13-4 denote address/ID memories, and numerals 14-1 to 14-4 denote monitoring timers. The numerals in FIG. 5 are identical to the numerals in FIG. 1.

Figures 1, 2:
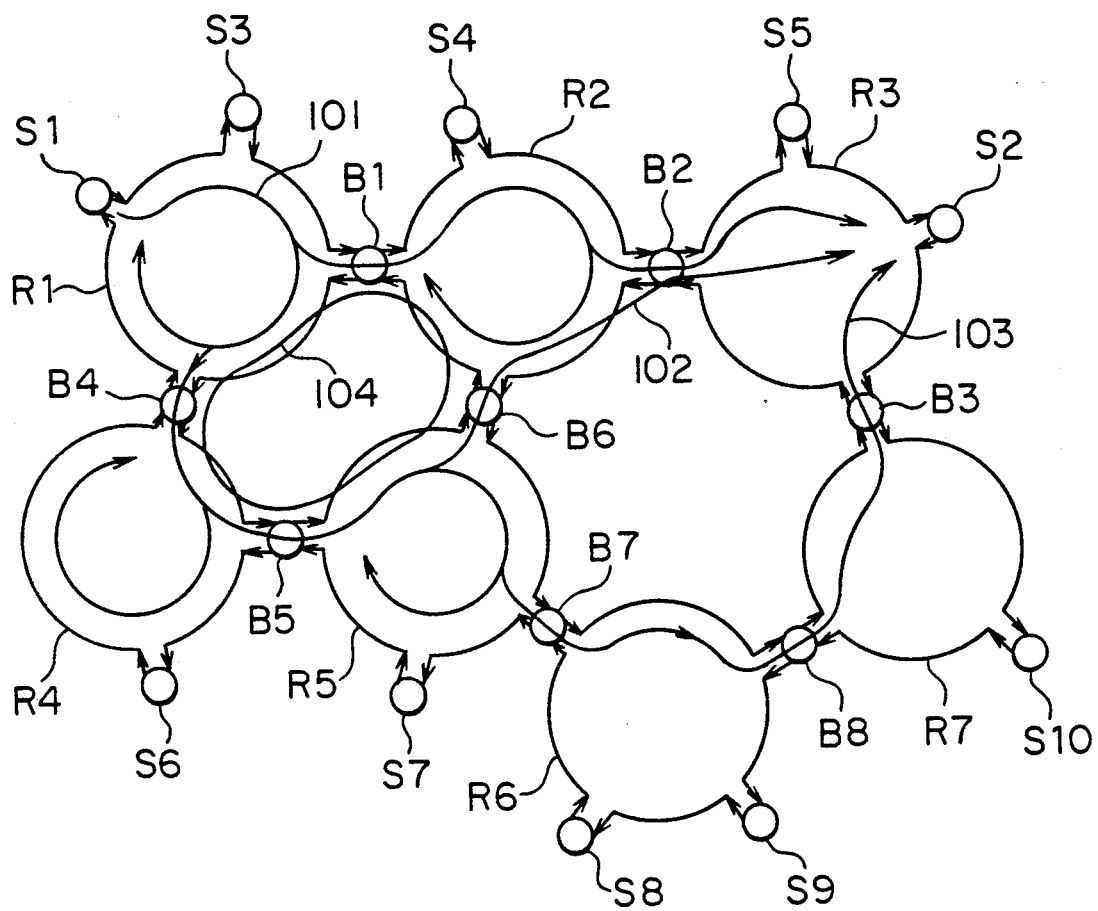
FIG. 1 shows a configuration of a multi-network system conceived in a process of the present invention.
FIG. 2 shows a format of a data frame on the multi-network.

The embodiment of the multi-network system of the present invention is configured in the same manner as that shown in FIG. 1, and the data frame of the present invention transmitted in the network is formatted as shown in FIG. 4. The data frame comprises a frame header FH, a designation station address DA, a source station address SA, routing information RI, data I, a frame trailer FT and an identification code ID added by the present invention. The identification code is a special code for identifying a plurality of data frames transmitted by a source station to a destination station. It may be a sequential code. The identification code ID may be a special code which is unique to each source station or destination station. Further, the routing information of the identification code ID may be provided in a bridge so that it may be imported to a data frame which is directed to a specfic destination station and has no source station address. Alternatively, it may be imparted to a data frame which has only a frame having a pair of specific source station address and destination station address. Further, in order to broadcast to all stations on the network, the routing information may be stored in a bridge which passes, a frame having no source station address, no destination station address and no routing information.

The operation is explained for the multi-network system shown in FIG. 5 which has the identical configuration to that of the multi-network system of FIG. 1.

It is assumed that a data frame which has no route designation because a route has not yet been decided is to be transmitted from the source station S1 connected to the transmission path R1 to the station S2 connected to the transmission path R3. In this case, the destination station address DA of the data frame shown in FIG. 4 has the address of the station S2, the source station address SA has the address of the station S1 and the identification code ID has IDi, and this data frame is transmitted from the source station S1. Since the data frame has no route designation, it is received by bridges B1 and B4 connected to the transmission path R1 and relayed to the adjacent transmission paths R2 and R4. The bridges connected to the transmission paths R2 and R4 also relay the data frames to the adjacent transmission paths. By the relay operations of the bridges, it is assumed that the bridge B6 receives the data frame from the source station S1 through the transmission path R1, the bridge B1 and the transmission path R2, relays it to the transmission path R5. Bridge B6 also receives the same data frame through the transmission path R1, the bridge B4, the transmission path R4, the bridge B5 and the transmission path R5. When each bridge receives the data frame to be relayed, it checks whether it has previously relayed the identical data frame or not, and if the currently received data frame is identical to the previously received data frame, it does not relay but discards the second or subsequently received data frame. Accordingly, the bridge B6 does not relay but discards the data frame received through the transmission path R1, the bridge B4, the transmission path R4, the bridge B5 and the transmission path R5. Since all of the bridges B1–B8 which interconnect the transmission paths R1–R7 have the above function, the data frame transmitted from the source station S1 is eventually transmitted to the sole destination station S2 through a single transmission route, for example, the route 101 shown in FIG. 5.

The configuration and operation of the bridges B1–B8 are now explained in detail with reference to FIG. 3.

As shown in FIG. 3, each bridge comprises receive units 3-1 and 3-2 connected to different transmission paths, transmit units 4-1 and 4-2, parallel control circuits 5-1 and 5-2 for relaying data frames, a buffer memory 6 and a frame check circuit 10 for checking whether an identical data frame has been received or not. The entire bridge is controlled by the processor 1 and the program memory 2. The frame check circuit 10 comprises address/ID memories 13-1 to 13-4 which can store a plurality of sets of the destination station address DA, the source station address SA and the identification code ID of the data frame which is first received and to be relayed, monitoring timers 14-1 to 14-4 corresponding to the memories, comparators 11-1 and 11-2 for checking whether the received data frame is identical to a previously relayed data frame or not, and a selector 12 for selecting the monitoring timer 14-1 to 14-4 which has a slightly longer timing than a transmission time in a maximum transmission route in the network. The first reception is determined by whether the corresponding timer has been activated or not.

The bridge thus constructed is connected to the two adjacent transmission paths. When it detects the data frame to be relayed, from the data frames received from one of the transmission paths, it relays the data frame to the other transmission path the first time that data frame is received. In the present embodiment, the transmission path is a looped path.

In FIG. 3, a signal 7-1 received from the first transmission path is received by the receive unit 3-1, reshaped and the beginning of the data frame, the station address and the identification code are detected. The received information is converted to parallel information which is supplied to the parallel control circuit 5-1 through a received parallel data line 26-1. The parallel control circuit 5-1 checks whether the received data frame is to its own station or to any other station in the loop to which its own station belongs, and controls a transmission right. If the frame check circuit 10 determines that the received data frame is to be relayed to an upper logical link control (LLC) layer or the adjacent transmission path and a relay signal 25-1 is issued, the parallel control circuit 5-1 stores the received data frame in the buffer memory 6 for relaying. The data frame stored in the buffer memory 6 is then transmitted to the second adjacent transmission route as a serial transmission signal 8-2 through the parallel control circuit 5-2 to the second adjacent transmission path and the transmission unit 4-2. In the relay operation, a known method such as carrier sense multiple access with collision detection (CSMA/CD) method, token ring access method or token bus access method may be adopted in order to obtain the transmission right in transmitting the data frame to the second transmission path. The present invention is applicable whichever method is adopted.

When the bridge shown in FIG. 3 receives the information which need not be relayed to the adjacent transmission path and which is to be transmitted in the transmission path to which its own station is connected, it transfers the received signal 7-1 from the receive unit 3-1 to the transmit unit 4-1 and transmits the received data in the same transmission path as the transmission signal 8-1. This operation is also carried out for the received data from the second transmission path. Accordingly, the bridge is provided with memories for storing two sets of station address for the stations of the two transmission paths.

The frame check circuit 10 is connected to the receive unit 3-1 on the first transmission path, the parallel control circuit 5-1, the receive circuit 3-2 on the second transmission path and the parallel control circuit 5 2. It comprises the address/ID memories 13-1 to 13-4, the monitoring timers 14-1 to 14-4, the selector 12 and the comparators 11-1 and 11-2. The comparators 11-1 and 11-2 compare the source station address, the destination station address and the identification code of the data frame received during the activation time of the monitoring timers 14-1 to 14-4 with the contents of the address/ID memories 13-1 to 13-4 which are sequentially read under the control of the selector 12. The comparison may be made in parallel to the outputs of the memories 13-1 to 13-4, or may be made sequentially.

The operation of the frame check circuit 10 is explained below.

In FIG. 3, when the receive unit 3-1 receives the serial signal 7-1 from the first transmission path, it detects the beginning of the data frame of the received signal 7-1 and then detects the station addresses DA and SA and the identification code ID, and activates the comparator 11-1 and the selector 12 through the start comparison signal line 23-1 to cause the frame check circuit 10 to start the check. When none of the monitoring timers 14-1 to 14-4 is activated, nothing is contained in the address/ID memories 13-1 to 13-4, and the source and destination station addresses and the identification code ID of the received data frame are supplied to the address/ID memory 13-1 through the address/ID line 24-1, and they are stored therein by the new frame detection signal 20-1 from the comparator 11-1. The monitoring timer 14-1 associated with the memory 13-1 is activated by the new frame detection signal 20-1.

The data frame received by the receive unit 3-1 is relayed to the second transmission path by the relay signal 25-1 from the comparator, through the parallel control circuit 5-1, the buffer memory 6. The parallel control circuit 5-2 and the transmit unit 4-2, as described above.

The operation where the identical data frames, that is, the data frames having the identical identification codes from the identical source station to the identical destination station arrive at the bridge with a time lag through different routes is now explained. The received signal may be either the received signal 7-1 or the received signal 7-2, but in the following description, it is assumed that the identical data frames are the received signals 7-2 received from the second transmission path.

When the receive unit 3-2 receives the signal 7-2, it detects the beginning of the data frame of the received signal, and checks whether any of the monitoring times 14-1 to 14-4 is activated, by the start check signal 23-2. Assuming that the monitoring timer 14-1 is activated, the selector 12 selects the address/ID memory 13-1 by the select signal 30 and reads the content stored therein and supplies it to the comparator 11-2. On the other hand, the station addresses and the identification code of the data frame received by the receive unit 3-2 are supplied to the comparator 11-2 through the address-/ID signal line 24-2. The comparator 11-2 compares, by the compare signal 21-2 from the monitoring timer, the station addresses and the identification code from the address/ID memory 13-1 with the station addresses and identification code of the received data frame from the receive unit 3-2 to check if the identical data frame is received. If the received data frame is identical to a data frame which has already been relayed by the bridge, the comparator 11-2 issues the relay signal 25-2 to prevent the received data frame from being transferred to the parallel control unit 5-2 from the receive unit 3-2 through the receive parallel signal line 26-2. In this manner, the identical data frame is discarded and it is not transmitted to the other adjacent transmission path.

After the monitoring timer 14-1 has been activated for a predetermined time interval, the content stored so far in the address/ID memory 13-1 is invalidated. When a new data frame to be relayed is then received, the station addresses and the identification code in that data frame are stored in the manner described above.

In the operation of the frame check circuit, if the comparator 11-2 detects the receipt of a different data frame, that is, if a data frame having different station addresses and different identification code than those stored in the address/ID memory 13-1 is received while the monitoring timer 14-1 is active, the monitoring timer 14-2 is activated and the station addresses and the identification code of the data frame which has been newly received and is to be relayed are stored in the address/ID memory 13-2. This data frame is transmitted to the transmission path as a transmission signal 8-1 from the transmission unit 4-1 which is on the opposite side of the receiving transmission path.

In the operation of the bridge, the received signal to be relayed, whichever transmission path it is transmitted through, is compared with the station addresses and the identification codes in the address/ID memories 13-1 to 13-4 so that the relay of the identical data frame is inhibited. If the bridge simultaneously receives the identical data frames from both directions, the writing to the address/ID memory and the comparison are sequentially processed and not parallelly processed from both directions. Thus, in this case, the relay of either one of the data frames is always blocked.

In the bridge shown in FIG. 3, the processor 1 and the program memory 2 are connected to the parallel control circuits 5-1 and 5-2 and the buffer memory 6 through the bus 40 to control the upper layer and queue the relayed data frame. Any other configuration which can attain such a function may be used.

An operation timing of the bridge is explained with reference to FIG. 6.

In FIG. 6, received frames a1, a2, a3, b1, b2, c1, c2, d1 and d2 are data frames which have been received by a bridge and to be transmitted to the stations connected to other transmission paths, and the received frames a1-a3 are identical data frames which have been received with time lags through different routes. The received frames b1 and b2, c1 and c2, and d1 and d2 are also identical data frames.

It is assumed that the bridge is the bridge B6 shown in FIG. 5, the station S1 receives the data frame a which is transmitted to the transmission path R2 through the bridge B1, and the bridge B6 receives the received frame a1. The monitoring timer 14-1 of the bridge B6 is activated, the station addresses and the identification code of the received frame a1 are stored in the address/ID memory 13-1, and the received data frame a1 is relayed to the adjacent transmission path R5. Then, the frame a2 arrives at the bridge B6 through the bridge B4, the transmission path R4 and the bridge B5. Since the bridge B6 has already received the identical data frame a1, the comparator 11-2 of the bridge B1 detects that and the received frame a2 is not transferred to the parallel control circuit 5-2 but it is discarded in the bridge B6.

When the bridge B6 receives a different data frame b1 from the transmission line R2 or R5, it activates the monitoring timer 14-2, stores the station addresses and the identification code of the received frame b1 in the address/ID memory 13-2, and relays the received frame b1 to the adjacent transmission path. If any one of the source station address SA, the destination station address DA and the identification code ID of the data frame b1 is not equal to the corresponding address or code of the previously received data frame, the data frame b1 is determined as a new data frame.

In a similar manner, the received data frames c1 and d1 are relayed to the adjacent transmission paths but the data frames a3, b2, c2 and d2 are discarded in the bridge B6.

Thus, the data frame transmitted from the station S1 is transmitted to the destination station S2 through the transmission path R1, the bridge B1, the transmission path R2, the bridge B2 and the transmission path R3. The data frame transmitted from the transmission path R2 to the bridge B6 reaches the bridge B3 through the transmission path R5, the bridge B7, the transmission path R6, the bridge B8 and the transmission path R7, and it is discarded in the bridge B3. The data frame that reached the bridge B6 through the bridge B5 and the transmission path R5 is discarded in the bridge B6. The data frame that reached the bridge B7 is also discarded. The data frame transmitted from the transmission path R3 to the transmission path R7 through the bridge B3 is discarded in the bridge B8 because the bridge B8 has already received the identical data frame from the transmission path R6.

In accordance with the present embodiment, only one of the identical data frames reaches the destination station, and the circulation of the data frame in the loop comprising a plurality of transmission paths is prevented.

In the present embodiment, the data frame without route designation is transmitted to the station S2. The present invention is also applicable to the multi-address calling where the common data frame is transmitted to a plurality of stations so that each station receives only one common data frame.

In the present embodiment, four sets of monitoring timer and address/ID memory are provided, although more sets may be provided. Bus type transmission paths may be used instead of the looped transmission paths.

In the present embodiment, when the transmission path is to be monitored or tested, it may be desired that the bridge relays all data frames including the identical frames. In such a case, a predetermined identification code, for example, all-"1" code may be prepared as a special identification code so that the identical data frame having such a special identification code is relayed.

The bridge records the relay in a separate recorder to record the result of monitoring and test.

I claim:
1. A multi-network system comprising:
    a plurality of data communication stations;
    a plurality of transmission paths each interconnecting two of said data communication stations to each other to transfer data frames therebetween;
    a plurality of bridges, each bridge interconnecting a pair of said transmission paths; and
    each of said data communication stations including means for adding an identification code to a data frame, said code identifying said data frame;
    wherein each of said bridges includes:
    a memory, said memory of each said bridge storing an identification code of a first data frame relayed through the bridge associated with said memory;
    a timer activated by a data frame transfer of said first data frame from a first transmission path to a second transmission path interconnected by said bridge and deactivated after a predetermined time interval selected to be longer than a transmission time in a maximum transmission route in the multi-network;

a comparator, checking, only during the activation of said timer, whether the identification code of a second received data frame matches an identification code stored in said memory for any intended transfer of said second received data frame via said bridge either from said first transmission path to said second transmission path or from said second transmission path to said first transmission path; and a data transferor connected to said comparator, relaying said second received data frame between said two transmission paths only when an identification code of said second data frame differs from identification codes stored in said memory as detected by said comparator.

2. A multi-network system according to claim 1 wherein said identification code is unique to the data frame.

3. In a multi-network system including a plurality of communication stations interconnected by a plurality of transmission paths, wherein said plurality of transmission paths are interconnected by a plurality of bridges such that a given bridge interconnects a pair of said plurality of transmission paths associated with said given bridge, the given bridge comprising:

a processor;

a receiver, receiving a data frame from either of the associated transmission paths;

a first memory, storing an identification code from said data frame the first time said receiver receives said data frame;

a temporary memory storing a second received data frame;

a comparator comparing a content of said temporary memory and a content of said first memory;

transmitter, transferring said second received data frame from the one of said associated transmission paths from which said second received data frame was received to the other of said associated transmission paths only after said comparator determines that said content of said temporary memory does not correspond to said content of said first memory;

means for transferring a data frame portion of said second received data frame of said temporary memory to said first memory when said comparator determines said content of said temporary memory does not correspond to said content of said first memory;

a timer activated to count down a predetermined time selected to be a time longer than a transmission time in a maximum transmission route in the network when said means for transferring transfers said data frame portion to said first memory;

wherein said first memory further stores a destination address and source address associated with said data frame.

4. The bridge of claim 3 wherein a timer is provided for each location in said first memory capable of storing information about a data frame and wherein when a timer associated with a given one of said locations completes counting down said predetermined time, said data frame information of said given one of said locations is invalidated.

5. A method for managing a flow of data frames between communication stations in a multi-network comprising a plurality of transmission paths, and a plurality of bridges, each of said bridges interconnecting two of said plurality of transmission paths, comprising the steps of:

providing an identification code in each data frame, said identification code identifying the associated data frame;

storing a first identification code of a first data frame in a memory of a given bridge when said first data frame is received by said given bridge;

producing a timing interval selected to be longer in time than a transmission time in a maximum transmission route in the multi-network;

comparing a second identification code of a received second data frame to said first identification code from said memory during said timing interval and after said first identification code is stored in said memory, to determined if the two identification codes correspond;

storing said second identification code in said memory if said step of comparing results in no correspondence;

transferring said received second data frame between transmission paths, via said given bridge, when said step of comparing results in no correspondence between identification codes;

discarding said received second data frame if said step of comparing results in correspondence between identification codes.

6. The method of claim 5 further comprising invalidating said first identification code in said memory after said time interval expires.

* * * * *